Patented Aug. 7, 1923.

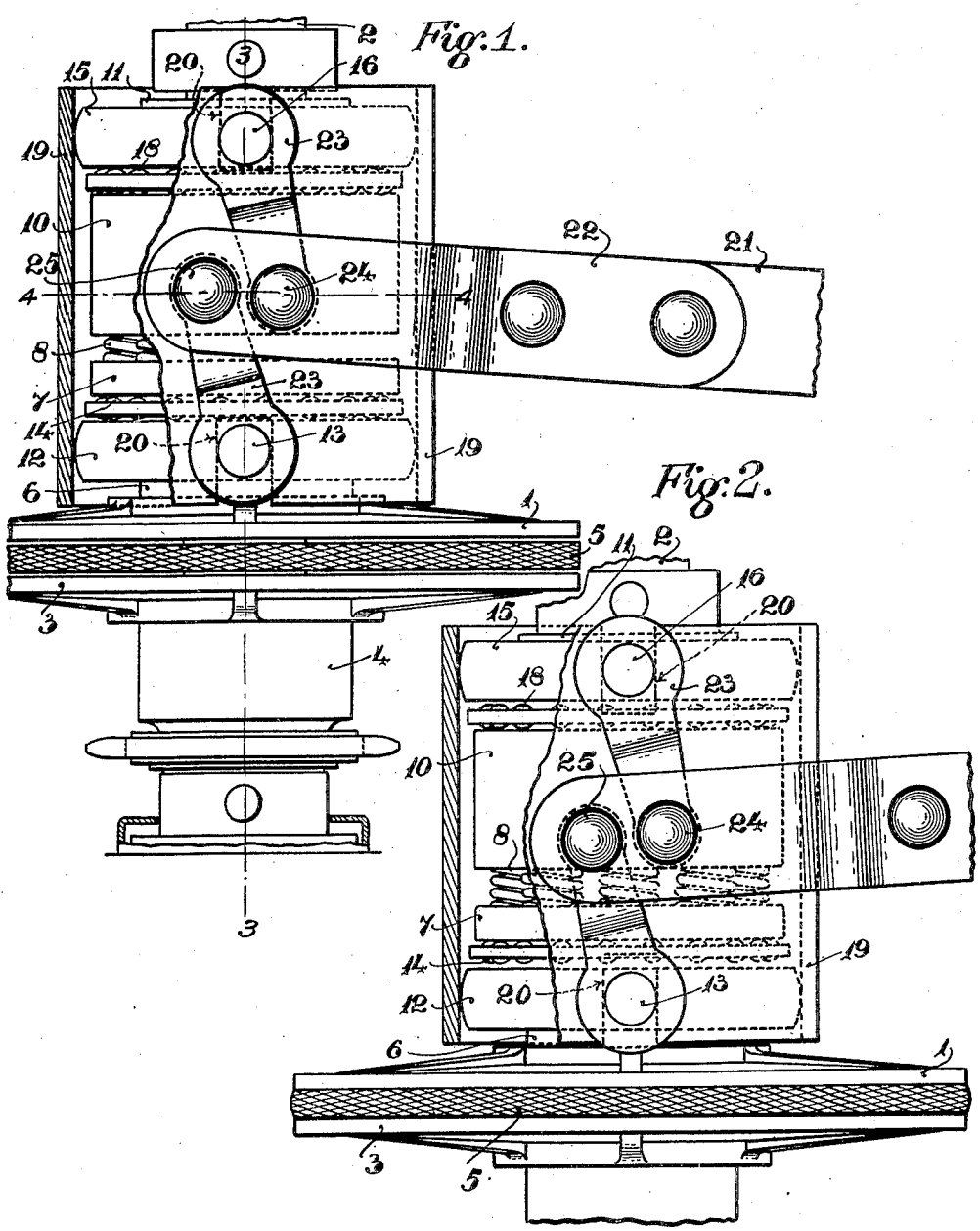

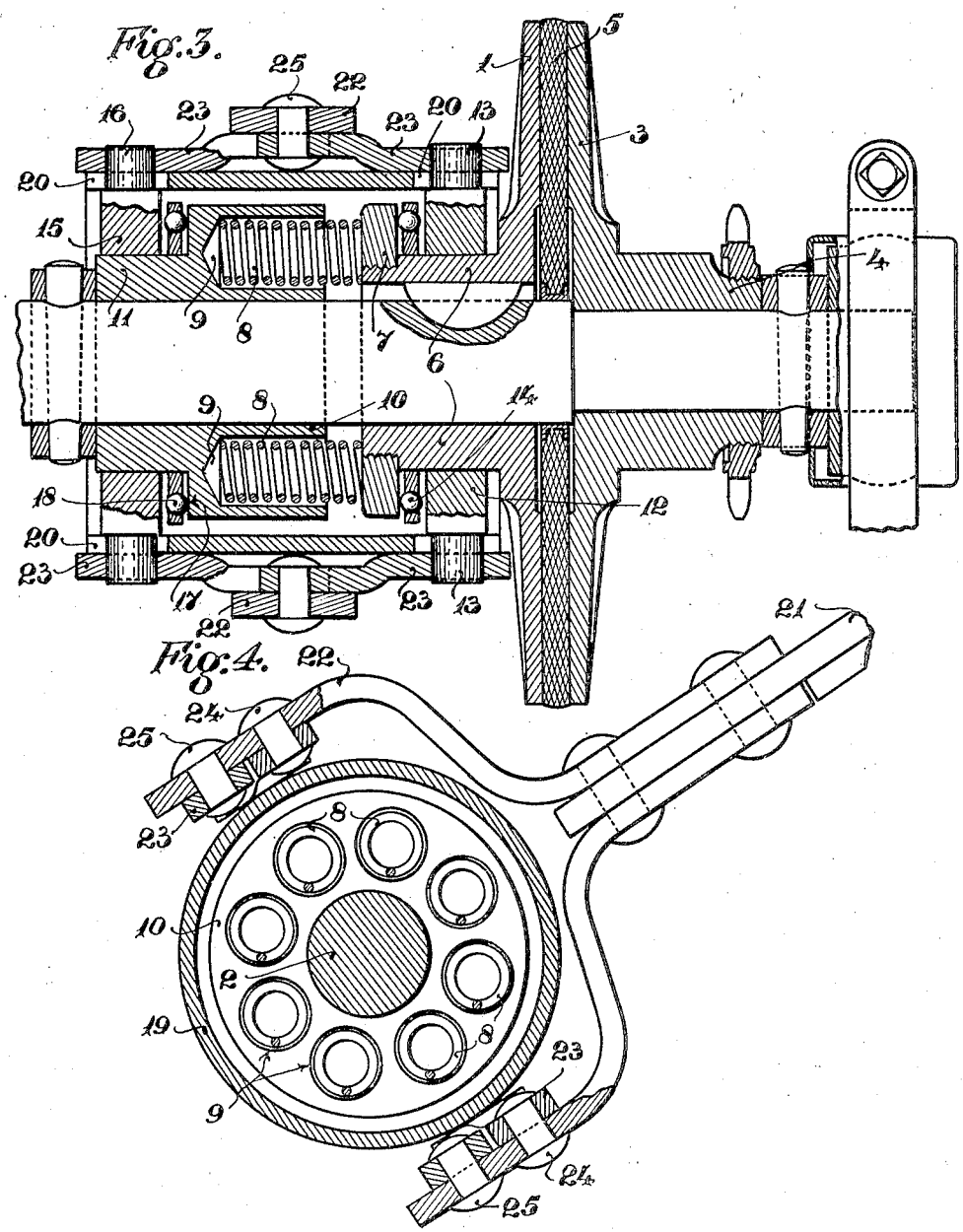

1,464,251

UNITED STATES PATENT OFFICE.

ERNEST WALTER STARKEY, OF BIRMINGHAM, ENGLAND, ASSIGNOR TO CHARLES H. PUGH LIMITED AND GEORGE FREDERICK BULL, OF BIRMINGHAM, ENGLAND.

FRICTION CLUTCH.

Application filed June 9, 1922. Serial No. 567,155.

*To all whom it may concern:*

Be it known that I, ERNEST WALTER STARKEY, subject of the King of Great Britain, residing at Birmingham, England, have invented certain new and useful Improvements in Friction Clutches, of which the following is a specification.

This invention relates to friction clutches for the transmission of power.

The object of the present invention is to provide improved means for disengaging the clutch whereby end thrust upon both the driving and driven shafts is obviated during the engaging and disengaging of the clutch, so that lateral strains upon the shaft bearings are avoided.

According to the said invention the operating lever or the like is mounted and fulcrumed upon members mounted upon either the driven or driving shafts, said lever or the like being suitably connected to the disengaging member of the clutch mounted upon the same shaft as the lever.

Figure 1 is a plan view of the clutch showing the friction members thereof disengaged.

Figure 2 is a similar view to Figure 1 but showing the friction members engaged.

Figure 3 is a longitudinal section through the clutch, on the line 3—3 of Fig. 1.

Figure 4 is a transverse section upon the line 4—4 Figure 1.

The invention is applicable to any system for the transmission of power wherein there is a driven and a driving shaft.

In carrying out the invention in its preferred form (as shown upon the accompanying drawings), in connection with a plate type of clutch, the driving member comprises a plate or disc feathered to slide upon the driving shaft 2 and opposed to a similar plate or disc 3 fixed upon the driven shaft 4, a suitable friction facing 5 being applied to one or both of the plates. The driving member 1 is carried by a boss or extension 6 upon the end of which is screwed a thrust collar 7 acted upon by a series of coiled springs 8 arranged around the shaft parallel therewith and located in housings 9 in the inner end 10 of a cylindrical member slidably mounted upon the driving shaft and having an extension 11 of reduced diameter at its outer end. The driving member 1 of the clutch is thus normally forced into driving engagement with the driven member 3 through the medium of the springs 8 acting upon the thrust collar 7 which in turn exerts pressure upon the driving member.

Mounted freely upon the boss 6 of the driving member is a loose clutch-withdrawal collar 12 provided with radial studs or pins 13 at diametrically opposite points, said collar being adapted to engage the thrust collar 7 (which is of larger diameter than the said boss) through the medium of a ball thrust bearing 14 carried in a loose ring or cage. Mounted upon the reduced outer end 11 of the cylindrical member carrying the springs is a similar loose clutch-withdrawal collar 15 provided with radial studs or pins 16 at diametrically opposite points, said collar being adapted to engage the outer face 17 of the larger diameter of the cylindrical member through the medium of a ball-thrust bearing 18 carried in a loose ring or cage. The loose withdrawal collars 12 and 15 and the parts situated between them are enclosed within a cylindrical casing or enclosure sleeve 19 having slots 20 in its opposite ends to receive the radial studs or pins of the said collars. This sleeve prevents the withdrawal collars from rotating relatively to each other and so retains the pins or studs in alignment.

The operating lever 21 for withdrawing the clutch terminates in a fork the branches 22 of which embrace the aforesaid casing or enclosure sleeve 19; and each said branch of the fork is coupled, by a pair of links 23 to the projecting studs or pins upon the respective sides of the two clutch-withdrawal collars, the said links being pivoted to the fork at points one above the other, so that the links normally take a slightly inclined position relatively to the axis of the shaft as is clearly seen in Figures 1 and 2.

It will be obvious that when the lever 21 is operated the clutch-withdrawal collars 12 and 15 are drawn towards each other owing to the pivots or fulcrum 24 and 25 sliding or moving relatively to each other, the springs 8 being thereby compressed thus disengaging the clutch.

Having fully described my invention, what I desire to claim and secure by Letters Patent is:—

In a power transmission system having a driving and a driven shaft; a friction clutch having clutch springs, a pair of members both mounted upon one of the shafts and located one at either end of the clutch springs, a clutch operating lever, a bifurcated inner end to the said lever, a pair of diametrically opposed pins upon each of the aforesaid members, a cylindrical casing having apertures in which the aforesaid pins are disposed in order to preserve their alignment, pairs of links connecting the forked ends of the lever to the pins in such a manner that upon the lever being operated the said members are moved relatively towards each other to disengage the clutch.

In testimony whereof I have hereunto set my hand in presence of two subscribing witnesses.

ERNEST WALTER STARKEY.

Witnesses:
W. L. SKERRETT,
W. N. SKERRETT.